US009672495B2

(12) United States Patent
Bittmann

(10) Patent No.: US 9,672,495 B2
(45) Date of Patent: Jun. 6, 2017

(54) ENHANCING FREQUENT ITEMSET MINING

(71) Applicant: Ran Bittmann, Tel Aviv (IL)

(72) Inventor: Ran Bittmann, Tel Aviv (IL)

(73) Assignee: SAP SE, Walldorf (DE)

( * ) Notice: Subject to any disclaimer, the term of this patent is extended or adjusted under 35 U.S.C. 154(b) by 349 days.

(21) Appl. No.: 14/581,085

(22) Filed: Dec. 23, 2014

(65) Prior Publication Data

US 2016/0179903 A1    Jun. 23, 2016

(51) Int. Cl.
*G06F 17/30* (2006.01)
*G06Q 10/10* (2012.01)

(52) U.S. Cl.
CPC ....... *G06Q 10/10* (2013.01); *G06F 17/30539* (2013.01); *G06F 17/30604* (2013.01); *G06F 2216/03* (2013.01)

(58) Field of Classification Search
CPC ......... G06F 17/30539; G06F 17/30604; G06F 2216/03; G06Q 10/10
USPC ......................................................... 707/754
See application file for complete search history.

(56) References Cited

U.S. PATENT DOCUMENTS

| | | | |
|---|---|---|---|
| 5,724,573 A | 3/1998 | Agrawal et al. | |
| 6,061,682 A * | 5/2000 | Agrawal | G06F 17/30539 707/694 |
| 6,092,064 A * | 7/2000 | Aggarwal | G06F 17/30327 707/694 |
| 6,094,645 A | 7/2000 | Aggarwal et al. | |
| 6,182,070 B1 | 1/2001 | Megiddo et al. | |
| 6,263,327 B1 * | 7/2001 | Aggarwal | G06F 17/3056 706/47 |
| 6,278,997 B1 | 8/2001 | Agrawal et al. | |
| 6,385,608 B1 | 5/2002 | Mitsuishi et al. | |
| 7,433,879 B1 * | 10/2008 | Sharma | G06F 17/30274 |
| 7,680,685 B2 | 3/2010 | Ouimet et al. | |
| 7,685,021 B2 | 3/2010 | Kumar et al. | |
| 7,962,526 B2 | 6/2011 | Li et al. | |

(Continued)

OTHER PUBLICATIONS

Cheung, Yin-Ling, et al., "Mining Frequent Itemsets without Support Threshold: With and without Item Constraints", IEEE Transactions on Knowledge and Data Engineering, vol. 16, No. 9, Sep. 2004, pp. 1052-1069.*

(Continued)

*Primary Examiner* — Robert Stevens
(74) *Attorney, Agent, or Firm* — Fish & Richardson P.C.

(57) ABSTRACT

The present disclosure describes methods, systems, and computer program products for improving frequent itemset mining. One computer-implemented method includes receiving, by operation of a computer system, a dataset of multiple transactions, each of the multiple transactions including one or more items; determining, by operation of the computer system, a ubiquitousness parameter of an item representing a frequency of occurrences of the item in the dataset; filtering, by operation of the computer system, out from the dataset one or more items that have ubiquitousness parameters larger than a ubiquitousness threshold; identifying, by operation of the computer system, one or more association rules that satisfy a confidence constraint based on the filtered dataset; and outputting, by operation of the computer system, the one or more association rules that satisfy the confidence constraint.

20 Claims, 5 Drawing Sheets

(56) References Cited

U.S. PATENT DOCUMENTS

| | | | |
|---|---|---|---|
| 8,401,986 B1* | 3/2013 | Franke | G06N 5/02 706/47 |
| 8,538,965 B1 | 9/2013 | Talyansky et al. | |
| 8,812,543 B2* | 8/2014 | Kanagasabapathi | G06N 5/025 707/776 |
| 2003/0217055 A1 | 11/2003 | Lee et al. | |
| 2004/0083206 A1 | 4/2004 | Wu et al. | |
| 2004/0098358 A1 | 5/2004 | Roediger | |
| 2007/0033185 A1* | 2/2007 | Maag | G06N 5/02 |
| 2011/0184922 A1 | 7/2011 | Lee | |
| 2012/0130964 A1 | 5/2012 | Yen et al. | |
| 2012/0254242 A1 | 10/2012 | Kanagasabapathi et al. | |
| 2013/0204919 A1 | 8/2013 | Kitazato | |
| 2015/0193853 A1* | 7/2015 | Ayzenshtat | G06Q 30/0631 705/26.7 |

OTHER PUBLICATIONS

Nair, Binesh, et al., "Accelerating Closed Frequent Itemset Mining by Elimination of Null Transactions", Journal of Emerging Trends in Computing and Information Sciences, vol. 2, No. 7, Jul. 2011, pp. 317-324.*

Hipp, Jochen, et al., "Algorithms for Association Rule Mining—A General Survey and Comparison", ACM SIGKDD Explorations Newsletter, vol. 2, Issue 1, Jun. 2000, pp. 58-64.*

Zaki, Mohammed J., "Generating Non-Redundant Association Rules", KDD 2000, Boston, MA, © ACM 2000, pp. 34-43.*

* cited by examiner

ENHANCING FREQUENT ITEMSET MINING

BACKGROUND

Frequent itemset mining (FIM) is a family of algorithms sometimes known as market basket analysis (MBA) or association rules learning. The family of algorithms are intended to discover relations or rules between items in large datasets in business analysis, marketing, or other applications. For example, the algorithms, applied to transaction data collected at a supermarket, can identify association relations or rules among products purchased by customers. Based on the association rules, custom behaviors can be analyzed and facilitate product promotion and sales. Some typical FIM algorithms include, for example, the APRIORI algorithm, the ECLAT algorithm, the FP-growth algorithm, and the linear time closed itemset miner (LCM) algorithm.

SUMMARY

The present disclosure relates to computer-implemented methods, computer-readable media, and computer systems for improving frequent itemset mining. One computer-implemented method includes receiving, by operation of a computer system, a dataset of multiple transactions, each of the multiple transactions including one or more items; determining, by operation of the computer system, a ubiquitousness parameter of an item representing a frequency of occurrences of the item in the dataset; filtering, by operation of the computer system, out from the dataset one or more items that have ubiquitousness parameters larger than a ubiquitousness threshold; identifying, by operation of the computer system, one or more association rules that satisfy a confidence constraint based on the filtered dataset; and outputting, by operation of the computer system, the one or more association rules that satisfy the confidence constraint.

Other implementations can include corresponding computer systems, apparatuses, and computer programs recorded on one or more computer storage devices, each configured to perform the actions of the methods. A system of one or more computers can be configured to perform particular operations or actions by virtue of having software, firmware, hardware, or a combination of software, firmware, or hardware installed on the system that in operation causes the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination:

A first aspect, combinable with the general implementation, further comprising identifying, by operation of the computer system, one or more itemsets that satisfy a support constraint based on the filtered dataset; and wherein identifying one or more association rules that satisfy a confidence constraint from the filtered dataset comprises identifying, from the one or more itemsets, the one or more association rules that satisfy a confidence constraint.

A second aspect, combinable with any of the previous aspects, further comprising identifying, by operation of the computer system, a support parameter for each itemset based on the filtered dataset; and identifying, by operation of the computer system, a confidence parameter for each association rule based on the one or more itemsets that satisfy the support constraint.

A third aspect, combinable with any of the previous aspects, further comprising adjusting the one or more association rules by performing a tradeoff between the ubiquitousness threshold, a support constraint, and a confidence constraint.

A fourth aspect, combinable with any of the previous aspects, further comprising outputting a list of items that have ubiquitousness parameters larger than the ubiquitousness threshold.

A fifth aspect, combinable with any of the previous aspects, wherein the ubiquitousness parameter of an item comprises a number of transactions that includes the item.

A sixth aspect, combinable with any of the previous aspects, wherein the ubiquitousness parameter of an item comprises a ratio of a number of transactions that includes the item to a total number of the multiple transactions in the dataset.

The subject matter described in this specification can be implemented in particular implementations so as to realize one or more of the following advantages. The example techniques can be applied to large, complex datasets that may not be able to be handled by existing techniques. The example techniques can improve the efficiency of FIM algorithms, reduce the computational complexity, reduce the memory requirement and reduce the running time. Other advantages will be apparent to those skilled in the art.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

Like reference numbers and designations in the various drawings indicate like elements.

DETAILED DESCRIPTION

The following detailed description is presented to enable any person skilled in the art to make, use, and/or practice the disclosed subject matter, and is provided in the context of one or more particular implementations. Various modifications to the disclosed implementations will be readily apparent to those skilled in the art, and the general principles defined herein may be applied to other implementations and applications without departing from the scope of the disclosure. Thus, the present disclosure is not intended to be limited to the described and/or illustrated implementations, but is to be accorded the widest scope consistent with the principles and features disclosed herein.

Frequent itemset mining (FIM) algorithms can receive a dataset of transactions as input. Each transaction can include a set of items. Typical input datasets can include a table with a column for the transaction ID and a column for the item ID (e.g., as shown in Table 1) or a sparse matrix (where space is allocated only for items that exist in a transaction) such as shown in Table 2. The ellipses in the tables indicate that a transaction may have additional items and there may be additional transactions.

TABLE 1

Input Table

| TRANSACTION ID | ID |
| --- | --- |
| transaction-1 | item-1 |
| transaction-2 | item-1 |
| transaction-3 | item-2 |
| transaction-2 | item-2 |
| transaction-1 | item-3 |
| transaction-1 | item-2 |
| transaction-3 | item-5 |
| . . . | |

TABLE 2

Input Sparse Matrix

| TRANSACTION-ID | ITEMS | | |
| --- | --- | --- | --- |
| transaction-1 | item-1 | item-2 | item-3 |
| transaction-2 | item-1 | item-2 | |
| transaction-3 | item-2 | item-5 | |
| . . . | | | |

These algorithms analyze the input and, based on a series of input parameters, suggest and output a series of association rules. An association rule can include two lists of items—a "right-hand side" and a "left-hand side," for example, as shown in the example output rule format in Table 3:

TABLE 3

Example output rule format

| LEFT HAND SIDE | RIGHT-HAND SIDE |
| --- | --- |
| item-2  item-5 | item-1  item-3 |

The association rules imply that when a set, possibly a new set, of items (referred to as an "itemset") includes the items in the left-hand side of the rule, it is likely that the same set will contain the items that appear on the right-hand side of the rule. In the example of Table 3, the association rule implies that a set containing item-2 and item-5 is likely to contain item-1 and item-3 as well.

Figure 1:
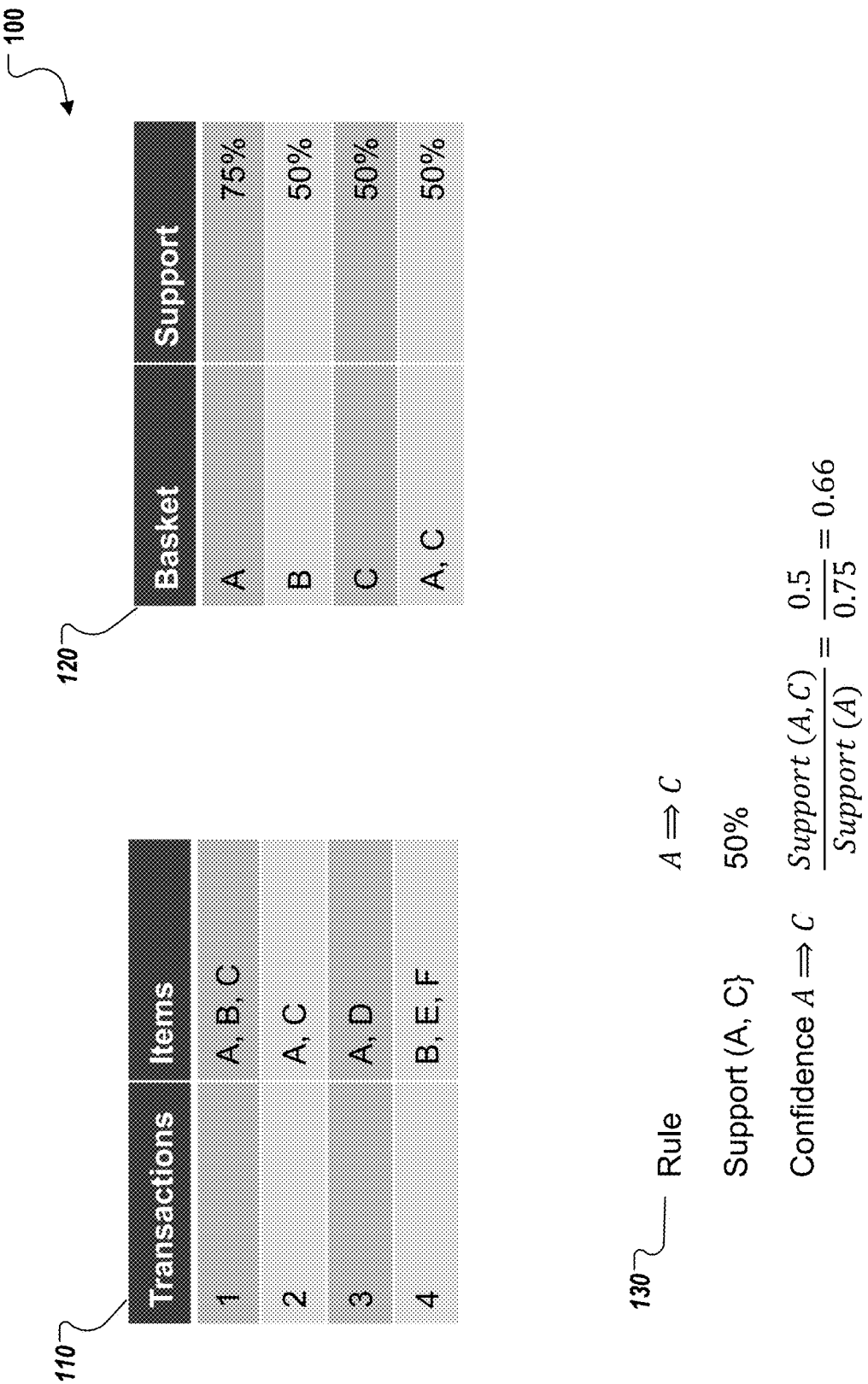
FIG. 1 is a plot showing an example dataset and parameters of a frequent itemset mining (FIM) algorithm according to an implementation.

FIG. 1 is a plot showing an example dataset 110 and parameters of a frequent itemset mining (FIM) algorithm according to an implementation. In some implementations, a rule can include two parts: 1) the basket and 2) the sides:

1) The basket—a basket includes all the items that appear in the rule. In other words, the basket can be an itemset that includes items on both sides of the rule. For example, the basket of the rule in Table 3 contains these items: item-1, item-2, item-3 and item-5. In some implementations, this basket is not necessarily a transaction basket. It can be part of multiple transactions baskets. In the example shown in FIG. 1, Table 120 shows four example baskets of the input dataset 110: {A}, {B}, {C}, and {A, C}.

2) The sides—a side includes items that appear in the respective side of the rule. The example rule 130 shown in FIG. 1 includes item A on the left-hand side and item C on the right-hand side.

Several other parameters can be defined and used in FIM algorithms for building association rules. Some example parameters include support, support constraint, confidence, and confidence constraint.

Support—The support of a basket is the proportion or fraction of transactions in the dataset (e.g., dataset 110) that contain the basket. In the example of FIG. 1, the supports of the four example baskets {A}, {B}, {C}, and {A, C} are 75%, 50%, 50%, and 50%, respectively.

Support Constraint—the minimum number of transactions out of the total number of transactions in which the basket appears, such that the basket is to be considered statistically significant for implementing the FIM algorithm. For example, if there is a total of 10 transactions in the dataset and a support constraint of 0.3 is required for a rule, then the rule's basket needs to appear in at least 3 transactions to be considered.

Confidence—a confidence of a rule is defined as the support of the basket of a rule divided by the support of the left-hand side of the rule. In other words, the confidence of the rule is the number of transactions where all the items on both sides of the rule appear out of the number of transactions where the items on the left-hand side of the rule appear. For example, in FIG. 1, the confidence of the rule 130 A=>C is defined as Support (A, C)/Support (A)=0.5/0.75=0.66.

Confidence Constraint—a minimum threshold of a confidence of a rule such that the rule is to be considered statistically significant for implementing FIM algorithms. For example, if the confidence constraint of the rule in Table 3 is 0.7 and there are 10 transactions containing item-2 and item-5, then at least 7 of them need to contain also item-1 and item-3, i.e., contain item-1, item-2, item-3, and item-5.

Note that a rule of the type item-X=>item-Y does not imply that the rule item-Y=>item-X will have sufficient confidence.

In some implementations, additional or different parameters may limit the number of items in each side of the rule or the total number of items in a rule.

The rationale behind the support constraint and confidence constraint is that there needs to be a minimum of transactions of a certain item combination to derive an association rule that can actually provide meaningful information. For example, in order to mine supermarket shopping and record all the transactions in a month, a single transaction containing both dog food and toothpaste does not necessarily imply that it is very likely for one who buys dog food to also buy toothpaste.

FIM algorithms are typically implemented to first find all possible baskets that satisfy the support constraint and then build the rules that satisfy the confidence constraint. Scanning all the combinations of items in the input dataset can be computationally expensive, especially for large datasets. In some implementations, with dense transactions and frequent items, the number of possible baskets to scan can increase exponentially, thus some FIM algorithms may not converge or return meaningful results.

Example techniques are described below for improving frequent itemset mining. For example, improving frequent itemset mining can be accomplished by identifying the effects of frequent items on deriving association rules and ignoring frequent items that do not contribute useful information to the association rules. For instance, there can be items that exist in many transactions of an input dataset but that do not bear a dependency to other items appearing in the same basket. Returning to the supermarket example, the customer may buy a nylon bag in almost every transaction. However, the nylon bag itself does not help predict or otherwise determine other items that the customer would have or has purchased. Thus, the fact that a nylon bag appears in the left or right side of the rule does not contribute useful information for deriving an association rule. However, the fact that this item is very frequently purchased can complicate the problem and increase the number of possible baskets that need to be scanned dramatically. As such, the example techniques for improving FIM can ignore these items (and therefore item combinations) that do not contribute to create meaningful rules.

The example techniques propose a new parameter to the FIM algorithms named "ubiquitousness." In some implementations, the ubiquitousness parameter can represent a frequency of occurrences of an item in the dataset. Unlike the support parameter that is applied to baskets (or itemset or item combinations), the ubiquitousness parameter is a metric of a single item. A ubiquitousness constraint can be defined as a ubiquitousness threshold value to filter out items that have a high ubiquitousness, i.e., are too frequent. The example techniques can remove items that have a ubiquitousness value larger than a particular ubiquitousness value constraint from consideration when implementing the FIM algorithms. As such, the example techniques can significantly reduce the number of scans of the baskets, thus lowering the computational complexity, improving the execution efficiency, and helping guarantee the convergence of the FIM algorithms.

In some implementations, a list of frequent items that are removed can be provided as an additional or optional output, with their corresponding ubiquitousness values.

In some implementations, the introduction of the ubiquitousness parameter and ubiquitousness constraint allows tradeoff among the three parameters, Support, Confidence, and Ubiquitousness, to reach an optimal set of rules, for example, by varying the respective constraints in multiple executions of the FIM algorithm.

In some implementations, the example techniques can be applied to datasets that could not be analyzed before. For example, the example techniques can be applied to real-life datasets (e.g., containing 3,000 items and 50,000 transactions with very dense transactions—about 60 items in a transaction on average) where some of the items are very frequent. The example techniques can reduce the number of rules and processing time (e.g., exponentially). The example techniques can produce association rules that otherwise could not have been produced (e.g., when other techniques render the FIM algorithm nonconvergent).

Figure 2:
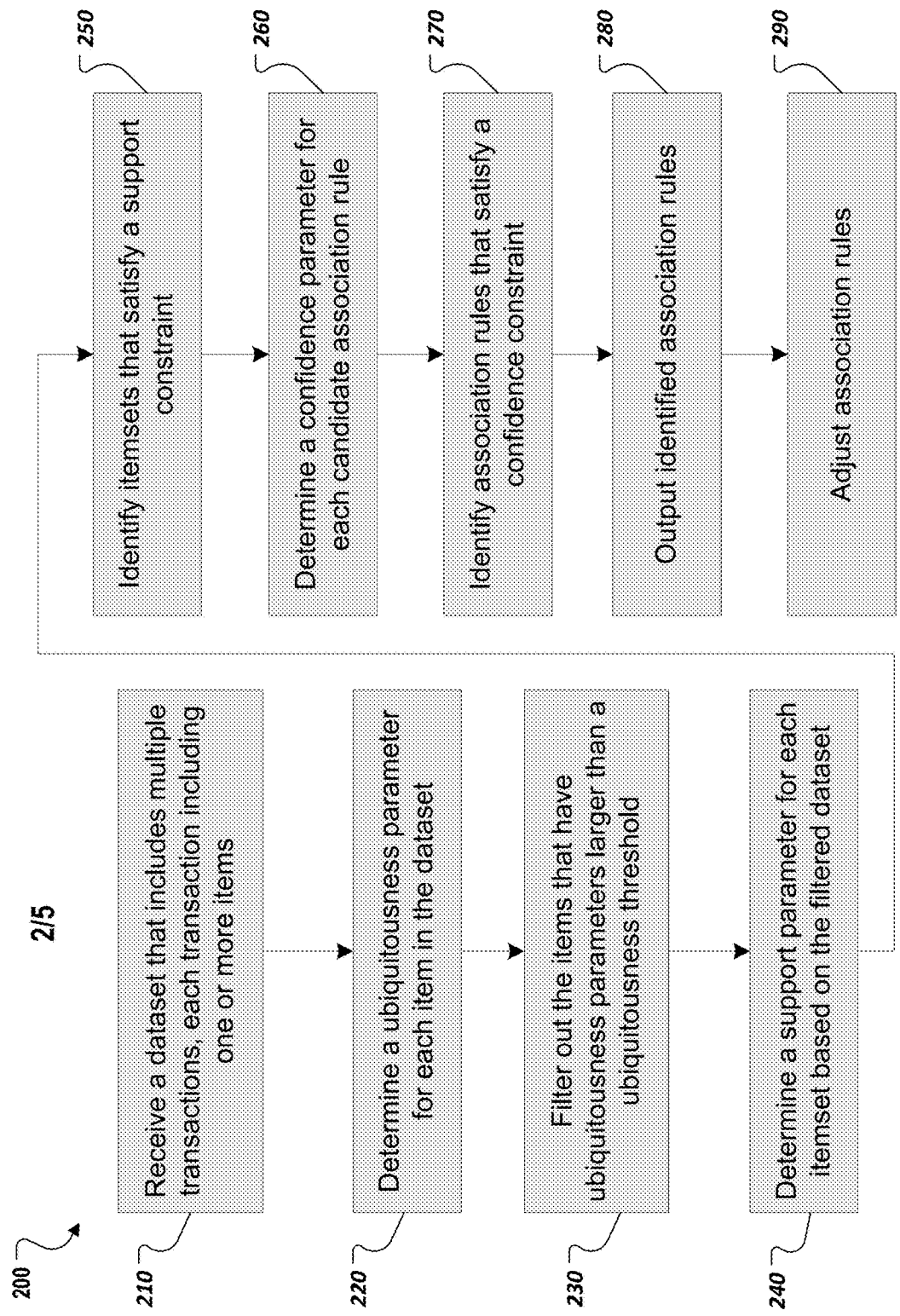
FIG. 2 is a flow chart illustrating a method for improving frequent itemset mining according to an implementation.

FIG. 2 is a flow chart illustrating a method 200 for improving frequent itemset mining according to an implementation. The example method 200 can be performed, for example, by the example computer or computer system as described with respect to FIG. 5, or any other suitable system, environment, software, and hardware, or a combination of systems, environments, software, and hardware as appropriate. In some implementations, various steps of method 200 can be run in parallel, in combination, in loops, and/or in any order.

At 210, a dataset of a number of transactions can be received. Each of the number of transactions can include one or more items. For example, the dataset can be the example dataset as shown in Tables. 1 and 2 and the dataset 110 in FIG. 1. From 210, method 200 proceeds to 220.

At 220, a ubiquitousness parameter of an item can be determined. In some implementations, the ubiquitousness parameter can represent a frequency of occurrences of the item in the dataset. In some implementations, the ubiquitousness parameter of an item can be a fraction of the number of transactions that the item appears in out of the total number of transactions in the dataset. In other implementations, the ubiquitousness parameter can otherwise be defined as the number of transactions that the item appears in. From 220, method 200 proceeds to 230.

At 230, if one or more items that have ubiquitousness parameters larger than a ubiquitousness threshold then the item or items can be filtered out from the dataset. The ubiquitousness threshold can be the ubiquitousness constraint that defines a maximum ubiquitousness value that the item is to be considered in deriving association rules by applying FIM algorithms. As a result, the filtered dataset includes items that appear less or with equally frequently than the ubiquitousness constraint. From 230, method 200 proceeds to 240.

At 240, a support parameter of each itemset can be determined based on the filtered dataset. The filtered dataset can be scanned to identify various itemsets and their respective supports. Each itemset can be a basket (e.g., as shown in table 120 of FIG. 1) that includes an item combination. The number of the itemsets can increase (e.g., exponentially or in another manner) with the length of the itemset (i.e., the number of items in the itemset). For example, if there are 4 items and all the item combinations are frequent, then there are 4 single item itemsets, 6 double item itemsets, 4 triple item itemset, and 1 quad item itemset. With the filtered dataset, the size of itemsets to be considered can be reduced, thus reducing the computational complexity. From 240, method 200 proceeds to 250.

At 250, one or more itemsets that satisfy a support constraint can be identified from the filtered dataset. The identified one or more itemsets have support parameters larger than or equal to the support constraint but less than the ubiquitousness constraint so that they are considered statistically significant for providing useful information for deriving association rules. From 250, method 200 proceeds to 260.

At 260, a confidence parameter of each candidate association rule can be determined from the one or more itemsets identified at 250. For example, the one or more itemsets that satisfy the support constraint and the ubiquitousness constraint can be scanned to identify one or more candidate association rules. Each candidate rule can include a left-hand side and a right-hand side (e.g., as the example rule in Table 3 and rule 130 of FIG. 1). The respective confidence parameters of the candidate association rules can be identified, for example, based on the support parameters of the left-hand side and the basket as described with respect to FIG. 1. For each itemset the confidence of all combinations of the possible rules, considering the rule length constraints, is calculated. For example, for the basket {a, b, c} and its contained smaller baskets {a, b}, {a, c}, {b, c}, assuming no length constraints, the following 9 rules can be identified and their respective confidence parameters can be calculated: {a}=>{b}, {a}=>{c}, {a}=>{b, d}, {b}=>{a}, {b}=>{c}, {b}=>{a, c}, {c}=>{a}, {c}=>{b}, {c}=>{a, b}. From 260, method 200 proceeds to 270.

At 270, one or more association rules that satisfy a confidence constraint can be identified. The identified association rules have confidence parameters larger than or equal to the confidence constraint so that the association rules are considered statistically significant, for example, for providing prediction and customer behavior analysis. From 270, method 200 proceeds to 280.

At 280, the one or more association rules that satisfy the confidence constraint can be output. For example, the one or more association rules can be output as text, table, list, graphic representations (e.g., image, chart, etc.), or in another format, for example, through a user interface. In some implementations, the output can include a list of items that have ubiquitousness higher than the ubiquitousness contraint. The list of items can output in the same or different manner as the association rules. In some implementations, some critical parameters (e.g., the support constraint, confidence constraint, and ubiquitousness constraint) and other results (e.g., the execution time, CPU or memory usage, etc.) of the FIM algorithms can be output together with, or seperated from, the association rules.

Figure 3:
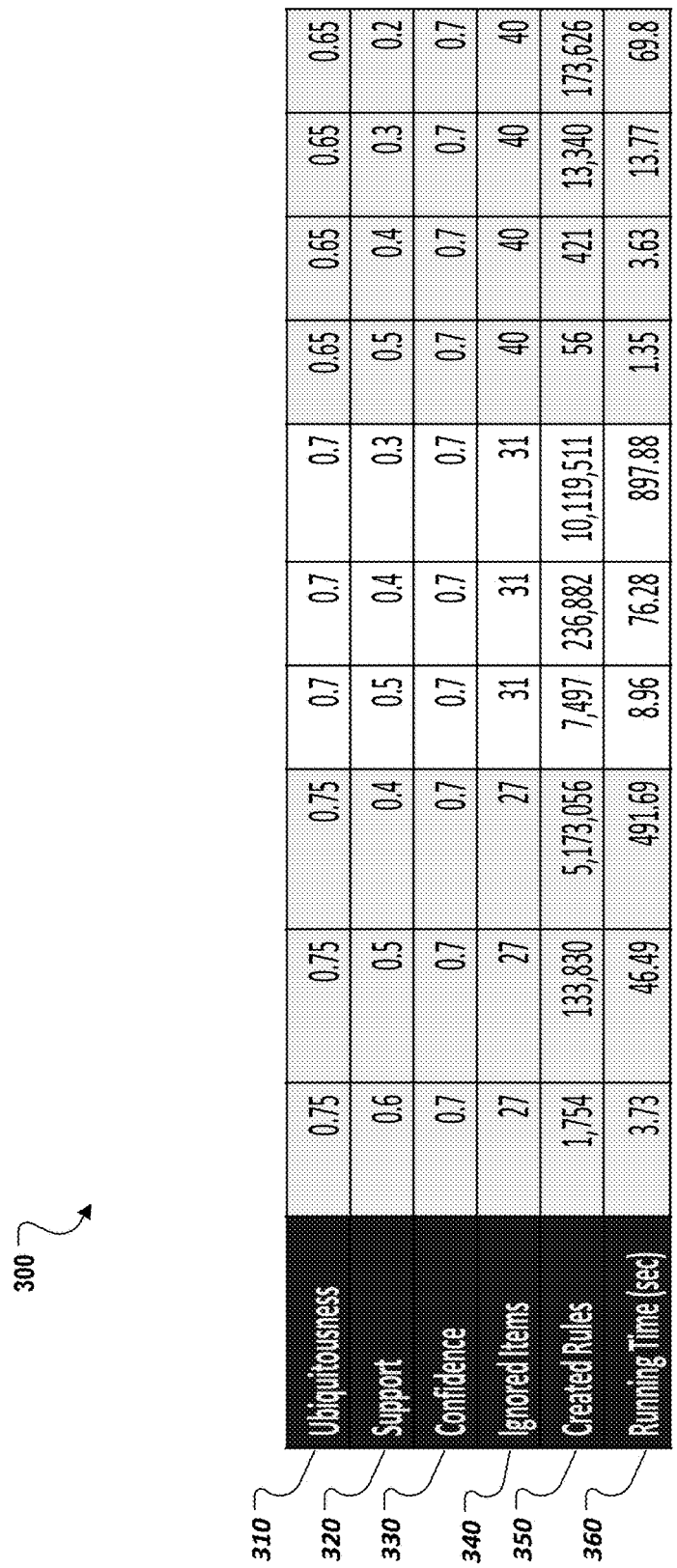
FIG. 3 is a table showing example results of associated rules obtained based on FIM algorithms with ubiquitousness parameters according to an implementation.
Figure 4:
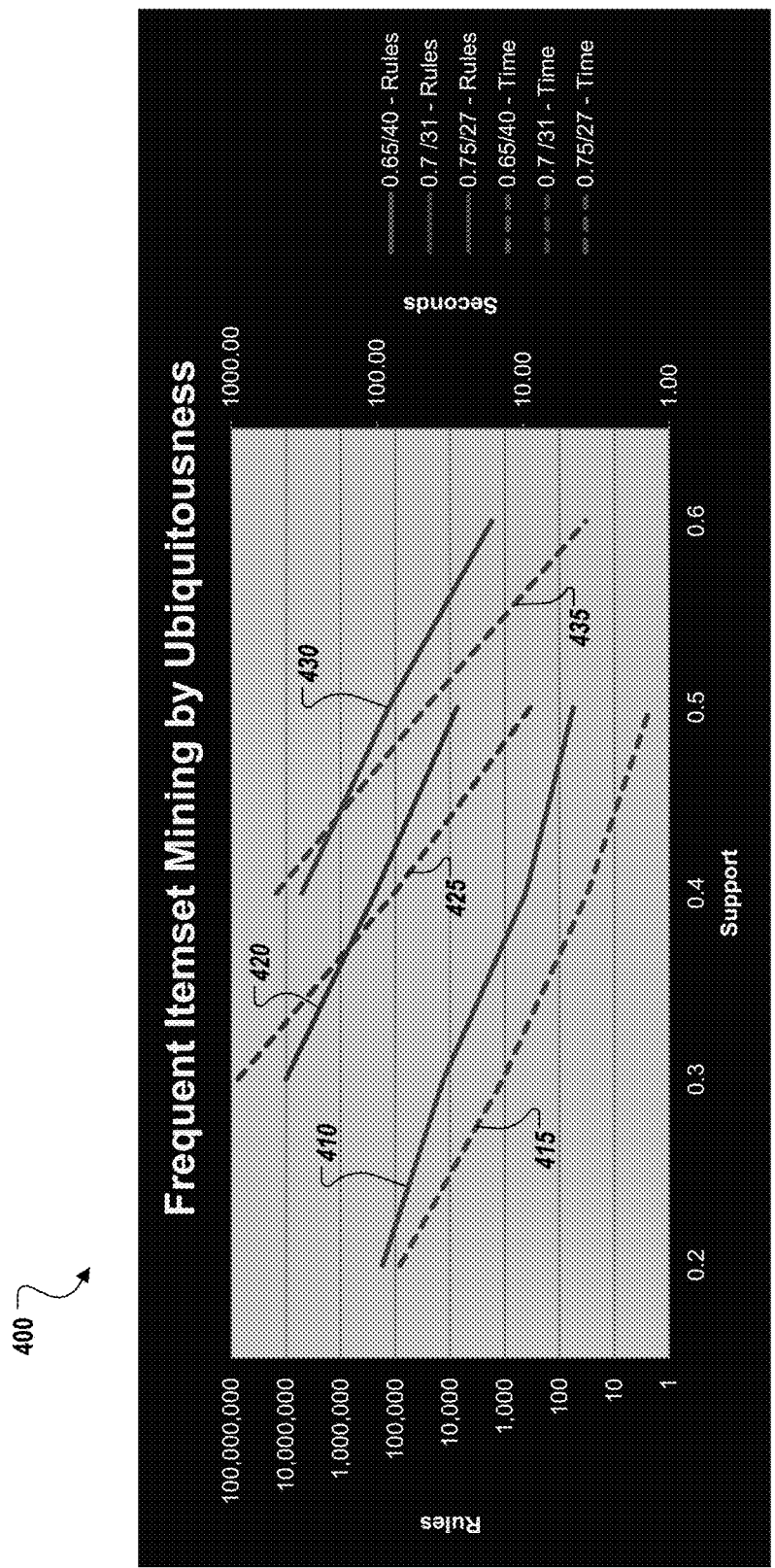
FIG. 4 is a plot showing example results of associated rules obtained based on FIM algorithms with ubiquitousness parameters according to an implementation.

At 290, the associated rules can be adjusted, for example, by performing a tradeoff between the support constraint, confidence constraint, ubiquitousness constraint, and/or other parameters. In some implementations, the method 200 can include receiving or otherwise identifying the values of these constraints (i.e., thresholds). The constraints can be set as default values or can be defined or updated manually or automatically. The processes 210-280 can be performed for a particular set of values and repeated if one or more of the values changes. By varying one or more of these parameters, the example method 200 can return different association rules at 280. The associated rules can be optimized or otherwise adjusted by selecting appropriate support constraint, confidence constraint, and ubiquitousness constraint based on criteria such as the number of output assocation rules, the running time of each implementation, etc. FIGS. 3 and 4 show example adjustment results according to an implementation. In some implementations, the adjustment results and the adjusted association rules can be output, for example, in a table or figure as shown in FIGS. 3 and 4, or in another manner. After 290, method 200 stops.

FIG. 3 is a table 300 illustrating example results of the associated rules obtained based on FIM algorithms with ubiquitousness parameters according to an implementation. The table 300 includes 10 execution results of the FIM algorithms with ubiquitousness parameters according to the example process 210-280. Among the 10 executions, the confidence constraint 330 remains the same as 0.7, but the ubiquitousness constraint 310 and support constraint 320 vary. As a result, the numbers of the ignored items (i.e., the items that have ubiquitousness parameters larger than the ubiquitousness constraint 310) vary from 27 to 40, the numbers of generated association rules vary from 56 to more than 10,000,000, and the running time varies from 1.35 seconds to about 900 seconds. As shown, given the same ubiquitousness constraint (e.g., 0.75, 0.7, or 0.65), a smaller support constraint leads to a higher number of association rules and more execution time. On the other hand, given the same support constraint (e.g., 0.5 or 0.4), a smaller ubiquitousness constraint leads to a smaller number of association rules and less execution time. Accordingly, the output association rules can be controlled or adjusted by selecting proper values of the same ubiquitousness constraint, support constraint, confidence constraint, or other parameters.

FIG. 4 is a plot 400 illustrating example results of the associated rules obtained based on FIM algorithms with ubiquitousness parameters according to an implementation. The plot 400 includes the number of output rules (represented by solid curves 410, 420, and 430) and the execution time (represented by dashed curves 415, 425, and 435) of the FIM algorithm with three different ubiquitousness constraints 0.65, 0.7, and 0.75, respectively. The two Y axes (left: the number of rules; right: the execution time) are on an exponential scale. As shown, the number of output rules and the execution time generally increase with the values of the ubiquitousness constraints, and/or with the values of the support constraints. In some implementations, based on the plot 400, the optimal ubiquitousness constraint, confidence constraint, or other parameters can be determined by reading, interpolating, or performing other mathematical manipulations of the curves 410, 420, and 430 or 415, 425, and 435 when the desired number of output association rules and/or execution time is pinpointed or determined. Additional or different techniques can be used to determine the appropriate parameters for adjusting the output of the FIM algorithms.

Figure 5:
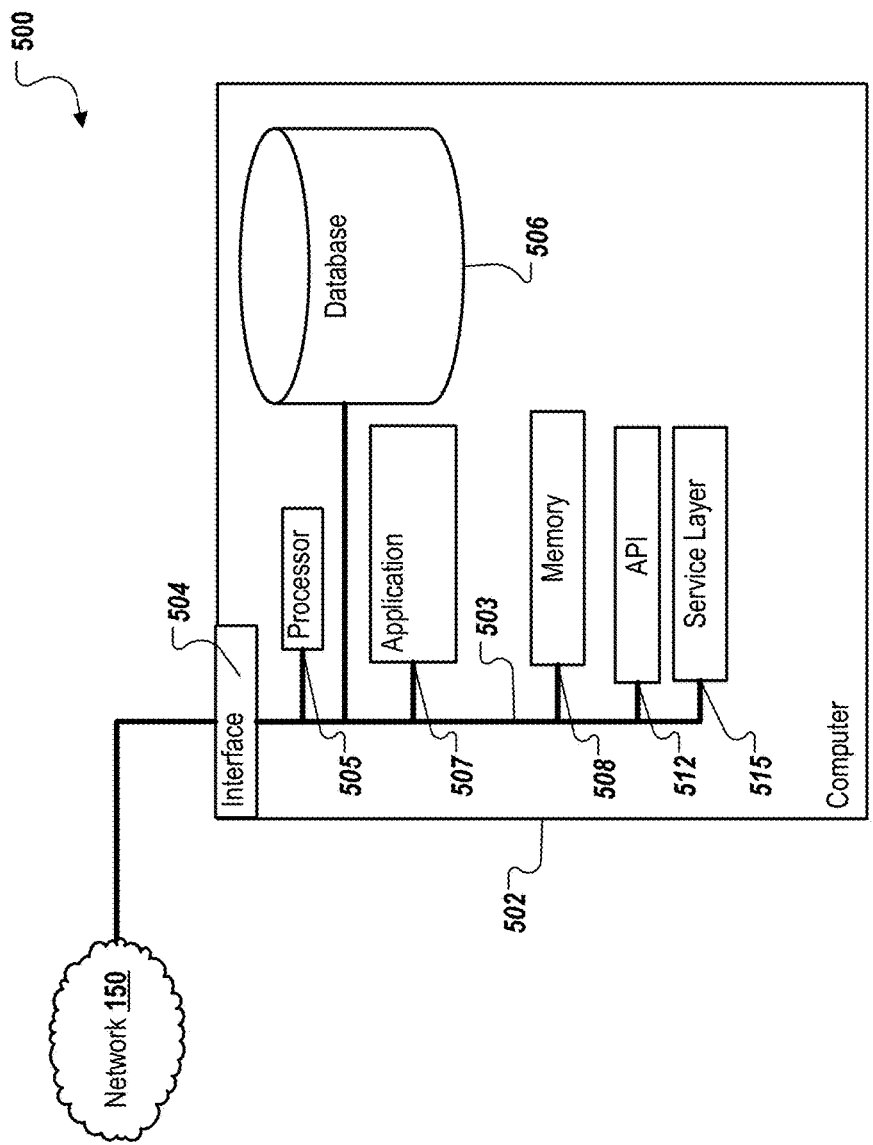
FIG. 5 is a block diagram of an exemplary computer that can be used for improving frequent itemset mining according to an implementation.

FIG. 5 is a block diagram 500 of an exemplary computer 502 that can be used for improving frequent itemset mining according to an implementation. The computer 502 can be a stand-alone computer system or a component of an example distributed computing system (EDCS) for improving frequent itemset mining according to an implementation. The illustrated computer 502 can encompass any computing device such as a server, desktop computer, laptop/notebook computer, wireless data port, smart phone, personal data assistant (PDA), tablet computing device, one or more processors within these devices, or any other suitable processing device, including both physical and/or virtual instances of the computing device. Additionally, the computer 502 may comprise a computer that includes an input device, such as a keypad, keyboard, touch screen, or other device that can accept user information, and an output device that conveys information associated with the operation of the computer 502, including digital data, visual and/or audio information, or a GUI.

The computer 502 can process for/serve as a client, a server, a UI layer, an application, and/or any other component of the EDCS. The illustrated computer 502 is communicably coupled with a network 150. In some implementations, one or more components of the computer 502 may be configured to operate within a cloud-computing-based environment. In some instances, the implementations of the example techniques described in this disclosure do not necessarily need the connection to the network.

At a high level, the computer 502 is an electronic computing device operable to receive, transmit, process, store, or manage data and information associated with the EDCS. According to some implementations, the computer 502 may also include or be communicably coupled with a cloud-computing server, application server, e-mail server, web server, caching server, streaming data server, business intelligence (BI) server, and/or other server.

The computer 502 can receive requests over network 150 from a client application (e.g., a mobile UI, web-based application UI, and/or a desktop application executing on this or another computer 502 in use by a customer) and respond to the received requests by processing the said requests in an appropriate software application. In addition, requests may also be sent to the computer 502 from internal users (e.g., from a command console or by other appropriate access method), external or third parties, other automated applications, as well as any other appropriate entities, individuals, systems, or computers.

Each of the components of the computer 502 can communicate using a system bus 503. In some implementations, any and/or all the components of the computer 502, both hardware and/or software, may interface with each other and/or the interface 504 over the system bus 503 using an API 512 and/or a service layer 515. The API 512 may include specifications for routines, data structures, and object classes. The API 512 may be either computer language-independent or -dependent and refer to a complete interface, a single function, or even a set of APIs. The service layer 515 provides software services to the computer 502 and/or the EDCS. The functionality of the computer 502 may be accessible for all service consumers using this service layer. Software services, such as those provided by the service layer 515, provide reusable, defined business functionalities through a defined interface. For example, the interface may be software written in JAVA, C++, or other suitable language providing data in extensible markup language (XML) format or other suitable format. While illustrated as an integrated component of the computer 502, alternative implementations may illustrate the API 512 and/or the service layer 515 as stand-alone components in relation to other components of the computer 502 and/or EDCS. Moreover, any or all parts of the API 512 and/or the service layer 515 may be implemented as child or sub-modules of another software module, enterprise application, or hardware module without departing from the scope of this disclosure.

The computer 502 includes an interface 504. Although illustrated as a single interface 504 in FIG. 5, two or more interfaces 504 may be used according to particular needs, desires, or particular implementations of the computer 502 and/or EDCS. The interface 504 is used by the computer 502 for communicating with other systems in a distributed environment—including within the EDCS—connected to the network 150. Generally, the interface 504 comprises logic encoded in software and/or hardware in a suitable combination and operable to communicate with the network 150. More specifically, the interface 504 may comprise software supporting one or more communication protocols associated with communications such that the network 150 or interface's hardware is operable to communicate physical signals within and outside of the illustrated EDCS.

The computer 502 includes a processor 505. Although illustrated as a single processor 505 in FIG. 5, two or more processors may be used according to particular needs, desires, or particular implementations of the computer 502 and/or the EDCS. Generally, the processor 505 executes instructions and manipulates data to perform the operations of the computer 502. Specifically, the processor 505 executes the functionality required for improving frequent itemset mining.

The computer 502 also includes a database 506 and memory 508 that hold data for the computer 502 and/or other components of the EDCS. Although illustrated as a single database 506 and memory 508 in FIG. 5, two or more databases 508 and memories 508 may be used according to particular needs, desires, or particular implementations of the computer 502 and/or the EDCS. While database 508 and memory 508 are illustrated as integral components of the computer 502, in alternative implementations, the database 506 and memory 508 can be external to the computer 502 and/or the EDCS. In some implementations, the database can be a conventional database or an in-memory database, or a mix of both. In some implementations, the database 506 and memory 508 can be combined into one component. In some implementations, the database is not mandatory, e.g. the data may be located in flat files or in memory, after getting them from an I/O device. Additionally or differently, volatile and/or non-volatile memory can be used.

The application 507 is an algorithmic software engine providing functionality according to particular needs, desires, or particular implementations of the computer 502 and/or the EDCS, particularly with respect to functionalities required for improving frequent itemset mining. Further, although illustrated as a single application 507, the application 507 may be implemented as multiple applications 507 on the computer 502. In addition, although illustrated as integral to the computer 502, in alternative implementations, the application 507 can be external to the computer 502 and/or the EDCS.

There may be any number of computers 502 associated with, or external to, the EDCS and communicating over network 150. Further, the term "client," "user," and other appropriate terminology may be used interchangeably as appropriate without departing from the scope of this disclosure. Moreover, this disclosure contemplates that many users may use one computer 502, or that one user may use multiple computers 502.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible, non-transitory computer-storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of one or more of them.

The terms "data processing apparatus," "computer," and/or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be or further include special purpose logic circuitry, e.g., a central processing unit (CPU), a graphical processing unit (GPU), an FPGA (field programmable gate array), or an ASIC (application-specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example LINUX, UNIX, WINDOWS, MAC OS, ANDROID, IOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a CPU, a GPU, an FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM) or both. The essential elements of a computer are a CPU for performing or executing instructions and one or more memory devices for storing instructions and data. Generally, a computer will also include, or be operatively coupled to, receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a global positioning system (GPS) receiver, or a portable storage device, e.g., a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, e.g., erasable programmable read-only memory (EPROM), elebctrically erasable programmable read-only memory (EEPROM), and flash memory devices; magnetic disks, e.g., internal hard disks or removable disks; magneto-optical disks; and CD-ROM, DVD+/−R, DVD-RAM, and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), LED (Light Emitting Diode), or plasma monitor, for displaying information to the user and a keyboard and a pointing device, e.g., a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of wireline and/or wireless digital data communication, e.g., a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n and/or 802.20, all or a portion of the Internet, and/or any other communication system or systems at one or more locations. The network may communicate with, for example, Internet Protocol (IP) packets, Frame Relay frames, Asynchronous Transfer Mode (ATM) cells, voice, video, data, and/or other suitable information between network addresses.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, both hardware and/or software, may interface with each other and/or the interface using an application programming interface (API) and/or a service layer. The API may include specifications for routines, data structures, and object classes. The API may be either computer language-independent or -dependent and refer to a complete interface, a single function, or even a set of APIs. The service layer provides software services to the computing system. The functionality of the various components of the computing system may be accessible for all service consumers using this service layer. Software services provide reusable, defined business functionalities through a defined interface. For example, the interface may be software written in JAVA, C++, or other suitable language providing data in extensible markup language (XML) format or other suitable format. The API and/or service layer may be an integral and/or a stand-alone component in relation to other components of the computing system. Moreover, any or all parts of the service layer may be implemented as child or sub-modules of another software module, enterprise application, or hardware module without departing from the scope of this disclosure.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation and/or integration of various system modules and components in the implementations described above should not be understood as requiring such separation and/or integration in all implementations, and it should be understood that the described program components and systems can generally be integrated together in a single software product or packaged into multiple software products.

Particular implementations of the subject matter have been described. Other implementations, alterations, and permutations of the described implementations are within the scope of the following claims as will be apparent to those skilled in the art. For example, the actions recited in the claims can be performed in a different order and still achieve desirable results.

Accordingly, the above description of example implementations does not define or constrain this disclosure. Other changes, substitutions, and alterations are also possible without departing from the spirit and scope of this disclosure.

What is claimed is:

1. A computer-implemented method comprising:
receiving, by operation of a computer system, a dataset of a plurality of transactions, each of the plurality of transactions including one or more items;
determining, by operation of the computer system, a ubiquitousness parameter of an item representing a frequency of occurrences of the item in the dataset;
filtering, by operation of the computer system, out from the dataset one or more items that have ubiquitousness parameters larger than a ubiquitousness threshold;
identifying, by operation of the computer system, one or more association rules that satisfy a confidence constraint based on the filtered dataset; and
outputting, by operation of the computer system, the one or more association rules that satisfy the confidence constraint.

2. The method of claim 1, further comprising:
identifying, by operation of the computer system, one or more itemsets that satisfy a support constraint based on the filtered dataset; and
wherein identifying one or more association rules that satisfy a confidence constraint from the filtered dataset comprises identifying, from the one or more itemsets, the one or more association rules that satisfy a confidence constraint.

3. The method of claim 2, further comprising:
identifying, by operation of the computer system, a support parameter for each itemset based on the filtered dataset; and
identifying, by operation of the computer system, a confidence parameter for each association rule based on the one or more itemsets that satisfy the support constraint.

4. The method of claim 1, further comprising adjusting the one or more association rules by performing a tradeoff between the ubiquitousness threshold, a support constraint, and a confidence constraint.

5. The method of claim 1, further comprising outputting a list of items that have ubiquitousness parameters larger than the ubiquitousness threshold.

6. The method of claim 1, wherein the ubiquitousness parameter of an item comprises a number of transactions that includes the item.

7. The method of claim 1, wherein the ubiquitousness parameter of an item comprises a ratio of a number of transactions that includes the item to a total number of the plurality of transactions in the dataset.

8. A non-transitory, computer-readable medium storing computer-readable instructions executable by a computer and configured to:
receive a dataset of a plurality of transactions, each of the plurality of transactions including one or more items;
determine a ubiquitousness parameter of an item representing a frequency of occurrences of the item in the dataset;
filter out from the dataset one or more items that have ubiquitousness parameters larger than a ubiquitousness threshold;
identify one or more association rules that satisfy a confidence constraint based on the filtered dataset; and
output the one or more association rules that satisfy the confidence constraint.

9. The medium of claim 8, further comprising instructions operable to:

identify one or more itemsets that satisfy a support constraint based on the filtered dataset; and wherein identifying one or more association rules that satisfy a confidence constraint from the filtered dataset comprises identifying, from the one or more itemsets, the one or more association rules that satisfy a confidence constraint.

10. The medium of claim 9, further comprising instructions operable to:
identify a support parameter for each itemset based on the filtered dataset; and
identify a confidence parameter for each association rule based on the one or more itemsets that satisfy the support constraint.

11. The medium of claim 8, further comprising instructions operable to adjust the one or more association rules by performing a tradeoff between the ubiquitousness threshold, a support constraint, and a confidence constraint.

12. The medium of claim 8, further comprising instructions operable to output a list of items that have ubiquitousness parameters larger than the ubiquitousness threshold.

13. The medium of claim 8, wherein the ubiquitousness parameter of an item comprises a number of transactions that includes the item.

14. The medium of claim 8, wherein the ubiquitousness parameter of an item comprises a ratio of a number of transactions that includes the item to a total number of the plurality of transactions in the dataset.

15. A system, comprising:
a memory;
at least one hardware processor interoperably coupled with the memory and configured to:
receive a dataset of a plurality of transactions, each of the plurality of transactions including one or more items;
determine a ubiquitousness parameter of an item representing a frequency of occurrences of the item in the dataset;
filter out from the dataset one or more items that have ubiquitousness parameters larger than a ubiquitousness threshold;
identify one or more association rules that satisfy a confidence constraint based on the filtered dataset; and
output the one or more association rules that satisfy the confidence constraint.

16. The system of claim 15, further configured to:
identify one or more itemsets that satisfy a support constraint based on the filtered dataset; and
wherein identifying one or more association rules that satisfy a confidence constraint from the filtered dataset comprises identifying, from the one or more itemsets, the one or more association rules that satisfy a confidence constraint.

17. The system of claim 16, further configured to:
identify a support parameter for each itemset based on the filtered dataset; and
identify a confidence parameter for each association rule based on the one or more itemsets that satisfy the support constraint.

18. The system of claim 15, further configured to adjust the one or more association rules by performing a tradeoff between the ubiquitousness threshold, a support constraint, and a confidence constraint.

19. The system of claim 15, further configured to output a list of items that have ubiquitousness parameters larger than the ubiquitousness threshold.

20. The system of claim 15, wherein the ubiquitousness parameter of an item comprises:
a number of transactions that includes the item; or
a ratio of a number of transactions that includes the item to a total number of the plurality of transactions in the dataset.

* * * * *